US011196733B2

United States Patent
Ja et al.

(10) Patent No.: US 11,196,733 B2
(45) Date of Patent: Dec. 7, 2021

(54) SYSTEM AND METHOD FOR GROUP OF GROUPS SINGLE SIGN-ON DEMARCATION BASED ON FIRST USER LOGIN

(71) Applicant: Dell Products L.P., Round Rock, TX (US)

(72) Inventors: Yee Ja, Round Rock, TX (US); Marshal F. Savage, Austin, TX (US); Cyril Jose, Austin, TX (US); Srihari Srirangam, Khammam (IN); Anto Dolphinjose Jesurajan Marystella, Round Rock, TX (US); Farhan Mohammed Syed, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 735 days.

(21) Appl. No.: 15/891,815

(22) Filed: Feb. 8, 2018

(65) Prior Publication Data
US 2019/0245843 A1 Aug. 8, 2019

(51) Int. Cl.
*G06F 21/41* (2013.01)
*H04L 29/06* (2006.01)

(52) U.S. Cl.
CPC .......... *H04L 63/0815* (2013.01); *G06F 21/41* (2013.01); *H04L 63/104* (2013.01); *H04L 63/107* (2013.01)

(58) Field of Classification Search
CPC .. H04L 63/0815; H04L 63/104; H04L 63/107
See application file for complete search history.

(56) References Cited

U.S. PATENT DOCUMENTS

| | | | |
|---|---|---|---|
| 6,295,361 B1 | 9/2001 | Kadansky et al. | |
| 6,339,423 B1* | 1/2002 | Sampson | G05B 19/0425 709/219 |
| 7,137,006 B1* | 11/2006 | Grandcolas | G06F 21/41 713/180 |

(Continued)

FOREIGN PATENT DOCUMENTS

| | | | | |
|---|---|---|---|---|
| GB | 2536044 | | 9/2016 | |
| KR | 20050117275 A | * | 12/2005 | ......... H04L 63/0815 |

OTHER PUBLICATIONS

Alaattin Burak Bekmezci, et al., A multi-layered approach to securing enterprise applications by using TLS, two-factor authentication and single sign-on, May 2-5, 2018, 2018 26th Signal Processing and Communications Applications Conference (SIU), pp. 1-4.*

M. Jones et al., "JSON Web Token (JWT)", May 2015, Internet Engineering Task Force (IETF) Request for Comments: 7519 (Year: 2015).*

"Multi-SSO (SAML 2.0) errors and fixes", 2014, obtained online from <https://docs.servicenow.com/bundle/paris-platform-administration/page/integrate/saml/reference/saml-errors.html>, retrieved on Aug. 9, 2021 (Year: 2014).*

(Continued)

*Primary Examiner* — Henry Tsang
*Assistant Examiner* — Zhimei Zhu
(74) *Attorney, Agent, or Firm* — Baker Botts L.L.P.

(57) ABSTRACT

Methods and systems for access in a management controller group hierarchy may involve receiving a request for a user at an information handling system, determining whether a link of trust is established, and validating the single sign-on request. The request may be to authenticate the user for access using a single sign-on token. Determination of whether the link of trust is established may be based on an initial login location stored in the single sign-on token. Validation of the single sign-on token may be based on a determination that the link of trust is established.

17 Claims, 9 Drawing Sheets

(56) References Cited

U.S. PATENT DOCUMENTS

| | | | |
|---|---|---|---|
| 7,480,934 B2* | 1/2009 | Chan | G06F 21/41 709/204 |
| 7,512,965 B1* | 3/2009 | Amdur | H04L 63/20 726/1 |
| 7,685,206 B1* | 3/2010 | Mathew | H04L 63/105 707/785 |
| 8,255,984 B1* | 8/2012 | Ghostine | G06F 21/62 726/8 |
| 8,418,232 B2* | 4/2013 | Miller | G06F 21/41 726/4 |
| 8,544,069 B1* | 9/2013 | Subbiah | H04L 63/0236 726/4 |
| 8,677,451 B1* | 3/2014 | Bhimaraju | H04L 63/0815 726/2 |
| 9,419,962 B2* | 8/2016 | Biswas | G06F 9/00 |
| 9,501,273 B1* | 11/2016 | Dai | H04L 67/42 |
| 9,705,871 B2* | 7/2017 | Engan | H04L 63/0815 |
| 9,887,836 B1 | 2/2018 | Roth | |
| 9,992,186 B1* | 6/2018 | Drozd | H04L 63/0807 |
| 10,057,246 B1* | 8/2018 | Drozd | G06F 21/335 |
| 10,320,796 B2* | 6/2019 | Lau | H04L 63/102 |
| 10,382,426 B2* | 8/2019 | Falodiya | H04L 63/0815 |
| 10,397,241 B2* | 8/2019 | White | H04L 67/1097 |
| 10,404,678 B2* | 9/2019 | Grajek | H04W 12/0609 |
| 10,623,395 B2* | 4/2020 | Saha | G06F 21/85 |
| 10,637,846 B2* | 4/2020 | Kunjaraman Pillai | H04L 63/0861 |
| 10,715,458 B1* | 7/2020 | Cahill | H04L 63/0815 |
| 2001/0000358 A1* | 4/2001 | Isomichi | G06F 21/41 726/13 |
| 2002/0073320 A1* | 6/2002 | Rinkevich | G06F 21/31 713/183 |
| 2003/0051026 A1* | 3/2003 | Carter | H04L 41/00 709/224 |
| 2003/0120948 A1* | 6/2003 | Schmidt | H04L 63/083 726/8 |
| 2003/0145204 A1* | 7/2003 | Nadooshan | H04L 9/3234 713/172 |
| 2003/0154403 A1* | 8/2003 | Keinsley | H04L 63/08 726/8 |
| 2003/0163733 A1* | 8/2003 | Barriga-Caceres | H04L 67/04 726/5 |
| 2004/0070604 A1* | 4/2004 | Bhat | G06T 11/001 715/741 |
| 2004/0098615 A1* | 5/2004 | Mowers | H04L 63/10 726/8 |
| 2004/0111645 A1* | 6/2004 | Baffes | H04L 63/102 726/8 |
| 2004/0128393 A1* | 7/2004 | Blakley, III | H04L 63/0815 709/229 |
| 2004/0260952 A1* | 12/2004 | Newman | H04L 63/104 726/6 |
| 2005/0005094 A1* | 1/2005 | Jamieson | H04L 63/0807 713/155 |
| 2005/0021978 A1* | 1/2005 | Bhat | H04L 63/102 713/182 |
| 2005/0081055 A1* | 4/2005 | Patrick | G06F 21/6218 726/26 |
| 2005/0097166 A1* | 5/2005 | Patrick | H04L 63/20 709/203 |
| 2005/0097352 A1* | 5/2005 | Patrick | H04L 63/20 726/26 |
| 2005/0097353 A1* | 5/2005 | Patrick | H04L 63/105 726/26 |
| 2005/0204041 A1* | 9/2005 | Blinn | H04L 63/08 709/225 |
| 2005/0251851 A1* | 11/2005 | Patrick | H04L 63/105 726/1 |
| 2005/0251852 A1* | 11/2005 | Patrick | H04L 63/20 726/1 |
| 2005/0257245 A1* | 11/2005 | Patrick | H04L 63/20 726/1 |
| 2005/0262362 A1* | 11/2005 | Patrick | H04L 63/0263 713/193 |
| 2005/0283443 A1* | 12/2005 | Hardt | H04L 9/3247 705/67 |
| 2006/0123472 A1* | 6/2006 | Schmidt | H04L 63/08 726/8 |
| 2006/0259614 A1* | 11/2006 | Patrick | G06F 21/6218 709/224 |
| 2006/0259954 A1* | 11/2006 | Patrick | G06F 21/6209 726/2 |
| 2006/0259977 A1* | 11/2006 | Patrick | G06F 21/6245 726/26 |
| 2008/0021997 A1* | 1/2008 | Hinton | H04L 63/0815 709/225 |
| 2008/0072300 A1* | 3/2008 | Garbow | H04L 63/0815 726/8 |
| 2008/0072301 A1* | 3/2008 | Chia | H04L 63/0815 726/8 |
| 2008/0077809 A1* | 3/2008 | Hayler | H04L 63/0428 713/193 |
| 2008/0134286 A1* | 6/2008 | Amdur | H04L 63/20 726/1 |
| 2008/0235361 A1* | 9/2008 | Crosbie | G06F 9/5027 709/223 |
| 2009/0249440 A1* | 10/2009 | Platt | H04L 63/20 726/1 |
| 2010/0306830 A1* | 12/2010 | Hardt | G06F 21/33 726/4 |
| 2010/0325427 A1* | 12/2010 | Ekberg | H04L 9/321 713/156 |
| 2012/0054741 A1* | 3/2012 | Ali | H04L 9/3234 718/1 |
| 2013/0086656 A1* | 4/2013 | Paddon | H04L 63/0815 726/6 |
| 2013/0086669 A1* | 4/2013 | Sondhi | H04L 63/0807 726/8 |
| 2013/0212665 A1* | 8/2013 | Goyal | G06F 21/41 726/8 |
| 2013/0232557 A1* | 9/2013 | Shimono | H04L 63/0815 726/4 |
| 2013/0332606 A1* | 12/2013 | Subramaniam | G06F 21/41 709/225 |
| 2014/0093082 A1 | 4/2014 | Jung et al. | |
| 2014/0123233 A1* | 5/2014 | Wu | H04L 63/107 726/4 |
| 2014/0208119 A1* | 7/2014 | Chang | H04L 67/42 713/176 |
| 2014/0230027 A1* | 8/2014 | Cha | H04L 63/0815 726/5 |
| 2014/0269327 A1* | 9/2014 | Fulknier | H04L 41/00 370/237 |
| 2014/0295821 A1* | 10/2014 | Qureshi | H04L 43/04 455/419 |
| 2015/0180858 A1* | 6/2015 | Shanmugam | H04L 63/0815 726/8 |
| 2015/0244706 A1* | 8/2015 | Grajek | H04W 12/0609 726/6 |
| 2015/0365399 A1* | 12/2015 | Biswas | H04L 63/0815 726/8 |
| 2016/0088023 A1* | 3/2016 | Handa | G06F 16/957 726/1 |
| 2016/0117176 A1* | 4/2016 | Gillon | G06F 9/4403 713/2 |
| 2016/0182499 A1* | 6/2016 | Sharaga | H04L 63/0823 713/156 |
| 2016/0218866 A1 | 7/2016 | Patil et al. | |
| 2016/0344582 A1 | 11/2016 | Shivanna et al. | |
| 2016/0365975 A1 | 12/2016 | Smith | |
| 2017/0026144 A1 | 1/2017 | Zinner | |
| 2017/0126404 A1* | 5/2017 | Unagami | H04L 9/0637 |
| 2017/0149767 A1* | 5/2017 | Hinton | H04L 63/10 |
| 2017/0149770 A1* | 5/2017 | Hinton | H04L 63/10 |
| 2017/0170963 A1* | 6/2017 | Xu | H04W 12/084 |
| 2017/0171950 A1 | 6/2017 | Bama et al. | |
| 2017/0244716 A1* | 8/2017 | Vissa | H04L 63/083 |
| 2017/0250812 A1* | 8/2017 | Schefenacker | H04L 9/30 |

(56) References Cited

U.S. PATENT DOCUMENTS

| | | | |
|---|---|---|---|
| 2017/0359440 A1* | 12/2017 | Hass | H04L 47/00 |
| 2018/0019869 A1* | 1/2018 | Savage | H04L 9/0833 |
| 2018/0020007 A1* | 1/2018 | Jesurajan Marystella | H04L 63/126 |
| 2018/0052772 A1* | 2/2018 | Tatsumi | G11C 7/1084 |
| 2018/0083953 A1* | 3/2018 | Sato | H04L 63/0815 |
| 2018/0088928 A1* | 3/2018 | Smith | G06F 8/65 |
| 2018/0103062 A1* | 4/2018 | White | G06F 21/60 |
| 2018/0219863 A1* | 8/2018 | Tran | H04W 12/06 |
| 2019/0028461 A1* | 1/2019 | Ishikawa | H04L 63/0815 |
| 2019/0102534 A1* | 4/2019 | Elias | H04L 63/0815 |
| 2019/0103968 A1* | 4/2019 | Srinivasan | G06F 21/41 |
| 2019/0158498 A1* | 5/2019 | Brouillette | G06F 21/604 |
| 2019/0158506 A1* | 5/2019 | Brouillette | H04L 67/306 |
| 2019/0163896 A1* | 5/2019 | Balaraman | H04L 9/0637 |
| 2020/0073656 A1* | 3/2020 | Satapathy | G06F 9/30145 |
| 2021/0021995 A1* | 1/2021 | Tran | H04L 63/06 |

OTHER PUBLICATIONS

Wikipedia contributors. (Oct. 8, 2018). Replay attack. In *Wikipedia, The Free Encyclopedia*. Retrieved 21:49, Feb. 5, 2019, from https://en.wikipedia.org/w/index php?title=Replay_attack&oldid=863032627; 6 pages.

Wikipedia contributors. (Jun. 12, 2018). Lamport timestamps. In *Wikipedia, The Free Encyclopedia*. Retrieved 21:50, Feb. 5, 2019, from https://en.wikipedia.org/w/index.php?title=Lamport_timestamps&oldid=845598900; 4 pages.

Wikipedia contributors. (Jan. 27, 2019). Vector clock. In *Wikipedia, The Free Encyclopedia*. Retrieved 21:52, Feb. 5, 2019, from https://en.wikipedia.org/w/index.php?title=Vector_clock&oldid=880371107; 3 pages.

Wikipedia contributors. (May 16, 2018). Matrix clock. In *Wikipedia, The Free Encyclopedia*. Retrieved 21:52, Feb. 5, 2019, from https://en.wikipedia.org/w/index.php?title=Matrix_clock&oldid~841539991; 1 page.

UEFI, "Unified Extensible Firmware Interface (UEFI) Specification", Retrieved from <http://uefi.org> May 2017; 2899 pages.

* cited by examiner

SYSTEM AND METHOD FOR GROUP OF GROUPS SINGLE SIGN-ON DEMARCATION BASED ON FIRST USER LOGIN

BACKGROUND

Field of the Disclosure

This disclosure relates generally to information handling systems and more particularly to systems and methods for single sign-on demarcation based on first user login.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The use of management controllers in information handling systems has increased in recent years. Broadly speaking, a management controller may be a device, system, or apparatus for remote monitoring or management of an information handling system. A management controller may be enabled to use a so-called 'out-of-band' network interface that is physically isolated from an 'in-band' network interface used generally for non-management communications. The management controller may include, or be an integral part of, a baseboard management controller (BMC), a Dell Remote Access Controller (DRAC), or an Integrated Dell Remote Access Controller (iDRAC). The management controller may be a secondary information handling system embedded in the information handling system.

SUMMARY

A secondary information handling system, which may be in the form of a management controller may communicate with other management controllers to form a local distributed computing node group. The local distributed computing node group may be formed by using exchanging public keys and Internet Protocol (IP) address information. In addition, one or more management controllers may form another distributed computing node group, which may not be previously communicatively coupled to the management controllers in the local distributed computing node group. Although the management controllers in the other distributed computing node group may perform related functions to those in the local distributed computing node group, management controllers in the local distributed computing node group may not be able to communicate with the management controllers in the other distributed computing node group. Thus, it may be desirable for the local distributed computing node group to communicate with other management controllers, such as those in another distributed computing node group, arranged in a distributed computing group hierarchy having two or more levels of distributed computing node groups.

A user, such as an administrator, may log in to a plurality of management controllers in the local distributed computing node group and across the distributed computing group hierarchy. Management controllers that are not in the local distributed computing node group may have privileges that are different than those in the local distributed computing node group. A user account and the associated privilege levels may vary from one management controller to another. For example, a user account at a management controller that may not be in the local distributed computing node group may have privileges that are different than those in a local distributed computing node group. However, the productivity of the user may be reduced by a need to enter the same user account credentials repeatedly to gain access to the management controllers. Thus, it may be desirable to enable the user to gain access to a plurality of management controllers without the user entering the same user account credentials repeatedly as the user navigates through the management controllers arranged in a distributed computing group hierarchy.

In one aspect, a disclosed method for access in a management controller group hierarchy includes receiving a request for a user at an information handling system, determining whether a link of trust is established, and validating the single sign-on request. The request may be to authenticate the user for access and may use a single sign-on token. Determining whether a link of trust is established may be based on an initial login location stored in the single sign-on token. Validating the single sign-on request may be based on a determination that the link of trust is established.

In certain embodiments the method may include determining whether the initial login location corresponds to an initial information handling system in the same local group of the management controller group hierarchy as the information handling system that received the request and granting the user full access based on a determination that the initial login location corresponds to an initial information handling system in the same local group of the management controller group hierarchy as the information handling system that received the request. The method may include determining whether the initial login location is recognized and based on a determination that the initial login location is not recognized, granting the user access to view information about an aggregate group in the management controller group hierarchy and denying the user access to the local group included in the aggregate group. The aggregate group may include at least one local group of information handling systems. The method may include receiving a request to elevate privileges of the user to enable access to a local group in the management controller group hierarchy, redirecting the request to a controlling member of the local group, and receiving a re-authenticated single sign-on token back from the controlling member of the local group. The information handling system may not be in the local group. The method may include determining whether the initial login location corresponds to an initial information handling system that manages an aggregate group in the management controller group hierarchy and granting the user full access based on a determination that the initial login location corresponds to the initial information handling system that manages the aggregate group in the management controller group hierarchy. The aggregate group may include the information handling system that received the request. The information handling system that received the request may be in a local group that is part of the aggregate group.

Another disclosed aspect includes an information handling system, comprising a processor subsystem having access to a first memory, and a management controller comprising a secondary processor having access to a second memory, the second memory including an embedded storage partition and the second memory storing instructions executable by the secondary processor.

A further disclosed aspect includes a management controller for an information handling system having a primary processor and a primary memory, the management controller comprising a secondary processor having access to a second memory, the second memory including an embedded storage partition and the second memory storing instructions executable by the secondary processor.

An additional disclosed aspect includes an article of manufacture comprising a non-transitory computer-readable medium storing instructions executable by a secondary processor, while an information handling system comprises a processor subsystem and the second processor.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
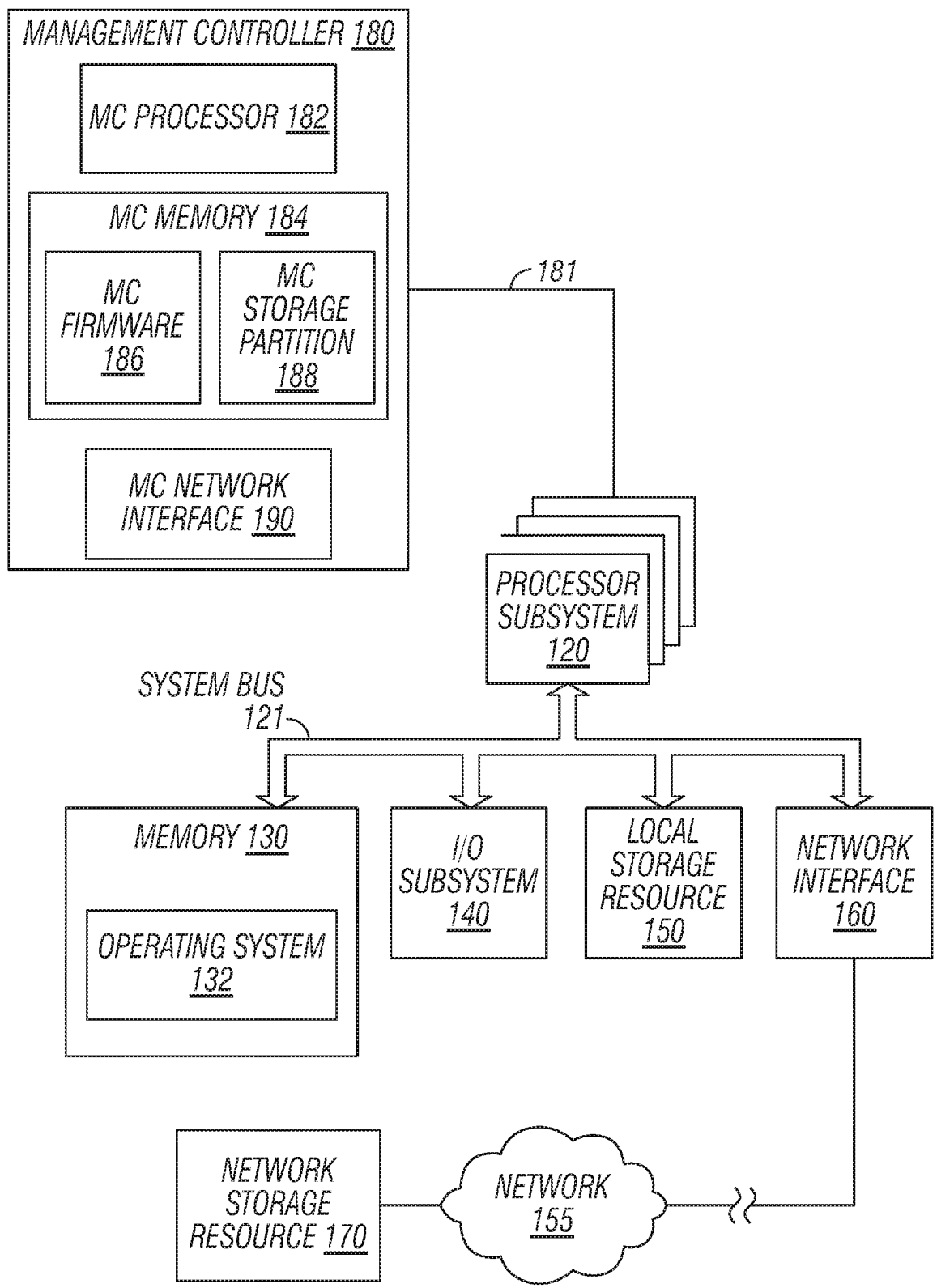
FIG. 1 is a block diagram of selected elements of an information handling system for single sign-on, in accordance with some embodiments of the present disclosure.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
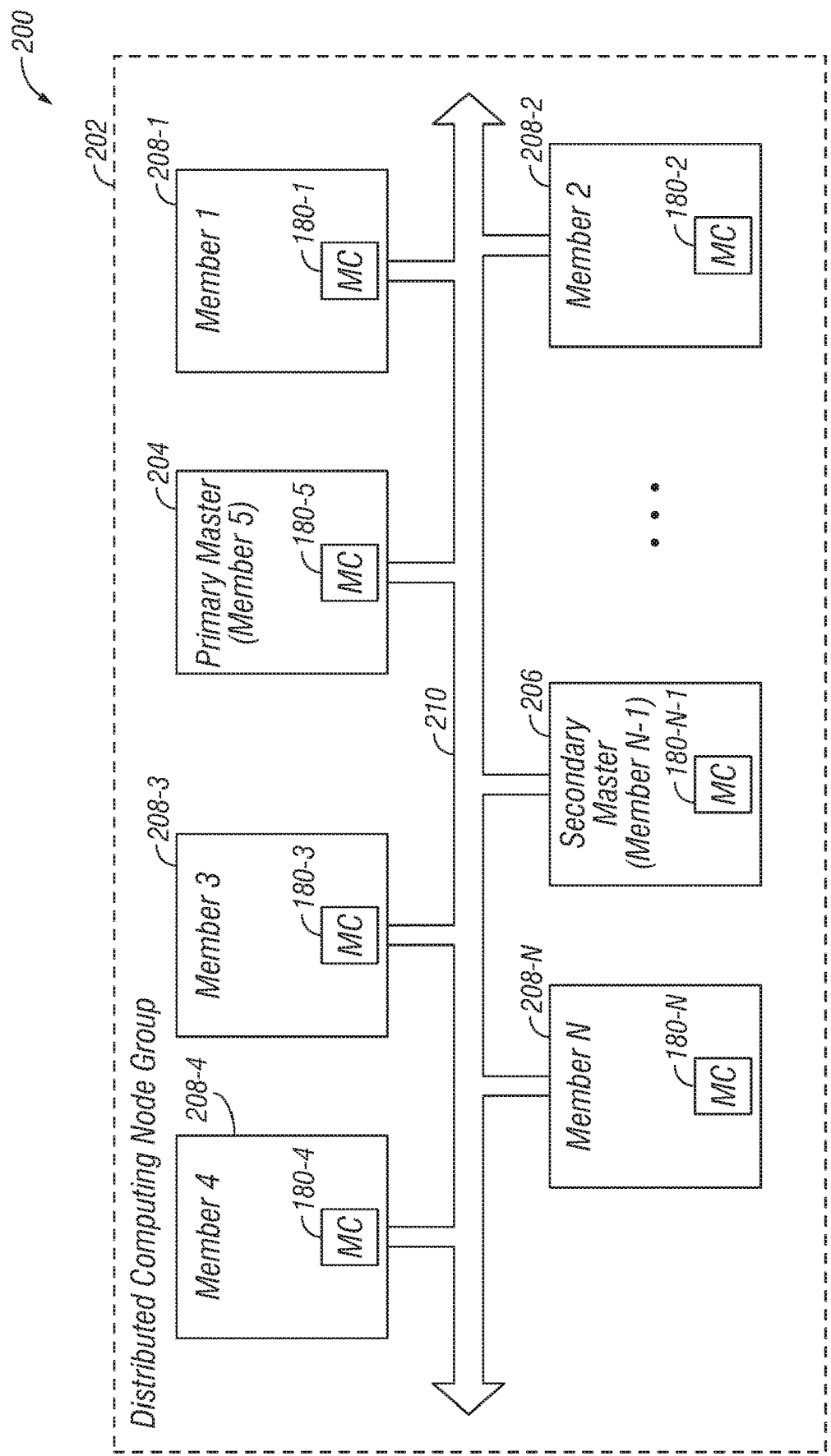
FIG. 2 is a block diagram of selected elements of a distributed computing node group for single sign-on, in accordance with some embodiments of the present disclosure.
Figure 3:
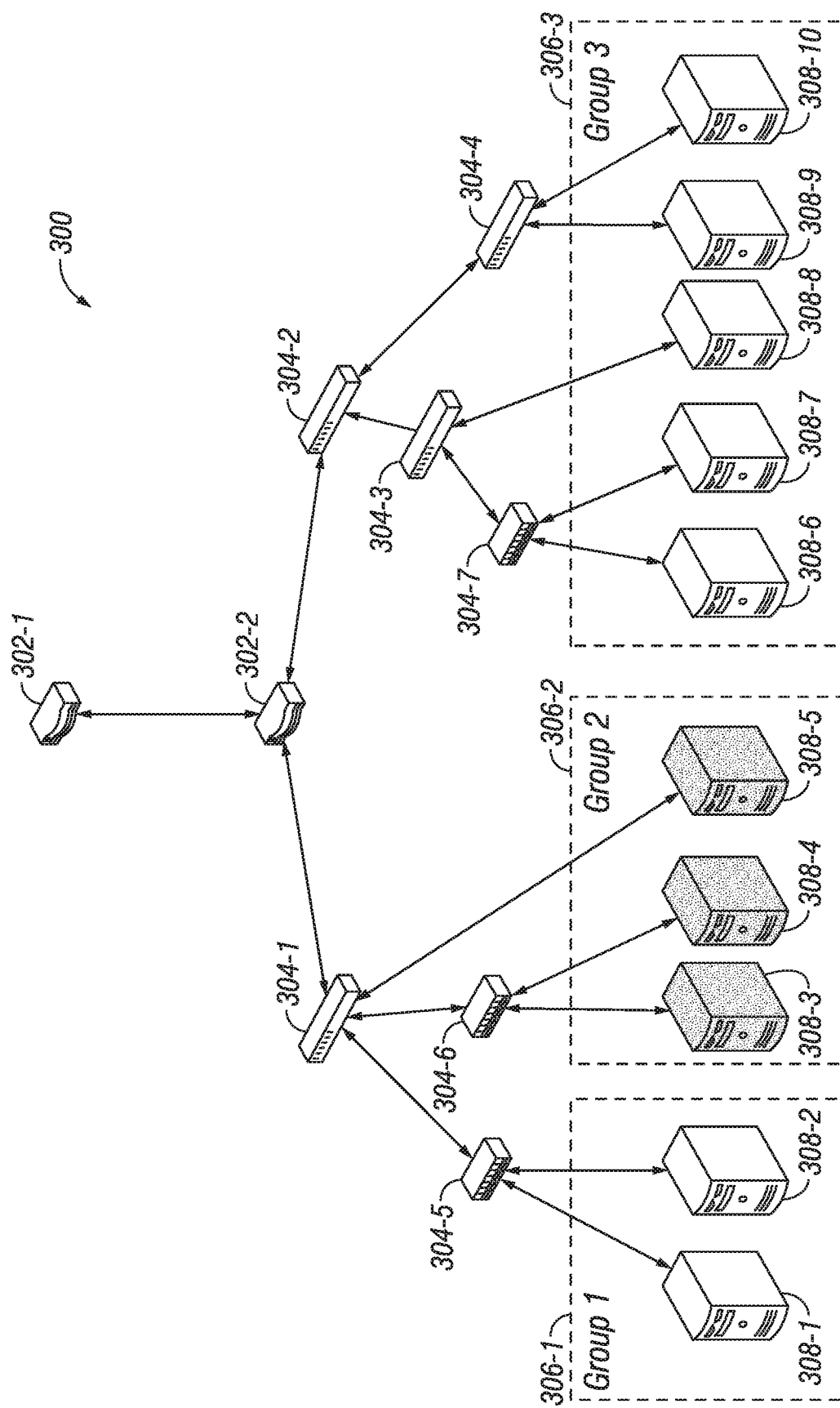
FIG. 3 is a block diagram of selected elements of a distributed computing group hierarchy, in accordance with some embodiments of the present disclosure.

Particular embodiments are best understood by reference to FIGS. 1-3 wherein like numbers are used to indicate like and corresponding parts.

Turning now to the drawings, FIG. 1 illustrates a block diagram depicting selected elements of an embodiment of information handling system 100 for single sign-on access. Also shown with information handling system 100 are external or remote elements, namely, network 155 and network storage resource 170.

As shown in FIG. 1, components of information handling system 100 may include, but are not limited to, processor subsystem 120, which may comprise one or more processors, and system bus 121 that communicatively couples various system components to processor subsystem 120 including, for example, memory 130, I/O subsystem 140, local storage resource 150, and network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 155. Network interface 160 may enable information handling system 100 to communicate over network 155 using a suitable transmission protocol and/or standard, including, but not limited to, transmission protocols and/or standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof. In certain embodiments, information handling system 100 and network 155 may be included in a rack domain.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory 130 and/or another component of physical hardware in processor subsystem 120). In the same or alternative embodiments, processor subsystem 120 may interpret and/or execute program instructions and/or process data stored remotely (e.g., in network storage resource 170).

Also in FIG. 1, memory 130 may comprise a system, device, or apparatus operable to retain and/or retrieve program instructions and/or data for a period of time (e.g., computer-readable media). As shown in the example embodiment of FIG. 1, memory 130 stores operating system 132, which may represent instructions executable by processor subsystem 120 to operate information handling system 100 after booting. It is noted that in different embodiments, operating system 132 may be stored at network storage resource 170 and may be accessed by processor subsystem 120 via network 155 Memory 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 100, is powered down.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. For example, local storage resource 150 may store executable code in the form of program files that may be loaded into memory 130 for execution, such as operating system 132. In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. For example, I/O subsystem 140 may include a Peripheral Component Interconnect Express (PCI-E) interface that is supported by processor subsystem 120. In certain embodiments, I/O subsystem 140 may comprise a touch panel and/or a display adapter. The touch panel (not shown) may include circuitry for enabling touch functionality in conjunction with a display (not shown) that is driven by display adapter (not shown).

Also shown in FIG. 1 is management controller (MC) 180, which may include MC processor 182 as a second processor included with information handling system 100 for certain management tasks. MC 180 may interface with processor subsystem 120 using any suitable communication link 181 including, but not limited to, a direct interface with a platform controller hub, a system bus, and a network interface. The system bus may be system bus 121, which may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. The network interface may be network interface 160 and/or network interface 190. The platform controller hub may provide additional functionality for the processor subsystem 120. The platform controller hub may be internal or external to a processor in processor subsystem 120. The direct interface may be any suitable interface to enable communications, including but not limited to Direct Media Interface (DMI) or PCI-Express.

MC processor 182 may have access to MC memory 184, which may store MC firmware 186, representing instructions executable by MC processor 182. Also shown stored in MC memory 184 is MC storage partition 188, which may represent an embedded storage partition for management controller 180. MC firmware 186 may represent pre-boot instructions executable by MC processor 182, for example, for preparing information handling system 100 to boot by activating various hardware components in preparation of launching operating system 132 for execution (also referred to as a basic input/output system (BIOS)). In certain embodiments, MC firmware 186 includes a Unified Extensible Firmware Interface (UEFI) according to a specification promulgated by the UEFI Forum (uefi.org). Also included with management controller 180 is MC network interface 190, which may be a secondary network interface to network interface 160. MC network interface 190 may provide "out-of-band" network access to management controller 180, for example, even when network interface 160 is unavailable. Thus, management controller 180 may execute MC firmware 186 on MC processor 182 and use MC network interface 190 even when other components in information handling system 100 are inoperable. It is noted that, in certain embodiments, management controller 180 may represent an instance of iDRAC while MC firmware 186 may include a lifecycle controller, which may assist in a variety of functions including, but not limited to, monitoring, updating, maintaining, testing, and deploying one or more components for an information handling system.

Management controller 180 may communicate with other management controllers using MC network interface 190. A set of management controllers in communication may form a group, in which each management controller may be a node. One of the management controllers in the group may operate as a group manager or a master. The master may facilitate and manage secure communication between the management controllers in the group. A set of groups in communication may form an aggregate group, in which each group may be a local group. Additional levels in the management controller hierarchy may be formed including, but not limited to, a bigger aggregate group including a set of aggregate groups.

A distributed computing node group may be part of a distributed computing group hierarchy with two or more levels of groups. For example, the distributed computing node group may be in the bottom level in the hierarchy and may be referred to as a local group. One or more local groups may be registered to form an aggregate group. The hierarchy may use a single sign-on token to enable a user to access multiple management controllers across the hierarchy without the need to repeatedly enter user access credentials. The single sign-on token may include an initial login location corresponding to the management controller where the user first logged in. The initial login location may be used to determine whether a subsequent request for authentication by the user corresponds to a traversal up or down the hierarchy. The initial login location may further be used to determine whether a subsequent request for authentication by the user corresponds to the same local group or same aggregate group. Trust links may be formed between local groups and their corresponding aggregate group. For example, a trust link may be formed between "Local Group 1" and "Local Group 2" via "Aggregate Group 1." The trust link may enable members of "Local Group 1" to view aggregate information about "Local Group 2" or to gain full access to "Local Group 2" based on a request to elevate the privileges of the user. If the initial login location corresponds to the group manager of an aggregate group, such as "Aggregate Group 1," the user may gain full access to all local groups, such as "Local Group 1" and "Local Group 2," down in the distributed computing group hierarchy from the aggregate group.

Referring now to FIG. 2, a block diagram of selected elements of a distributed computing node group for single sign-on is shown in accordance with some embodiments of the present disclosure. A set of information handling systems 200 may be grouped together to form a distributed computing node group 202. Group 202 may include a plurality of members 208 connected together with messaging channel 210. Although group 202 is shown with seven members, group 202 may include any number of members suitable to form a distributed computing node group.

Each member 208 may include a management controller 180 to manage group communications. Members 208 and/or management controllers 180 may use messaging channel 210 to send and receive messages to each other. The messages may be unencrypted, encrypted, signed, or unsigned. Messaging channel 210 may include any suitable interface between management controllers, including but not limited to a network interface, such as Ethernet, and an I/O interface, such as PCI-E. Group 202 may use secure messaging to improve the security of communications between members 208.

Group 202 may also include a member 208 that is a master, such as a primary master 204 and/or a secondary master 206. The master may control and/or manage group 202. Control of group 202 may include the addition and/or removal of members from group 202, and/or authenticating members of group 202 when the member transitions to an online state from an offline state. The master may perform any operation sufficient to control or manage distributed computing node group 202. For example, the primary master may be selected at random. As another example, the primary master may be selected using the timestamp of entry into the group, in which the most recent member to join the group or the least recent member to join the group is elected the primary master. The secondary master 206 may serve as the master when the primary master is offline or unavailable. The election or selection of the secondary master 206 may be performed in a similar manner as the primary master.

Referring now to FIG. 3, a block diagram of selected elements of a distributed computing group hierarchy is shown in accordance with some embodiments of the present disclosure. The distributed computing group hierarchy 300 may include a one or more routers 302, which form part of a network. The network may be a public and/or private network. Router 302-2 may route data between different distributed groups and/or within a distributed group. The distributed group 300 may also include one or more switches 304. Downstream of the routers, switches 304-1 and 304-2 may interface exclusively with other switches (304-3, 304-4, 304-5, 304-6 and 304-7). The switches 304 and routers 302 may collectively operate to facilitate the transmission of messages between the nodes in the distributed group.

The nodes may be grouped together to perform a particular type of function. For example, group 306-1 may include two information handling systems 308-1 and 308-2, which may be used for a SharePoint application. Group 306-2 may include three information handling systems 308-3, 308-4, and 308-5, which may be used for file and print operations. Group 306-3 may include five information handling systems 308-6, 308-7, 308-8, 308-9, and 308-10, which may be used for running various other applications. Each group may be uniquely identified through one or more attributes including, but not limited to, group name, universally unique identifier (UUID), or group passcode. Although a particular number of information handling systems are shown, one or more information handling systems may be configured to form one or more portions of a group or one or more groups. For example, groups 306-1, 306-2, and 306-3 may be subsystems within the same information handling system, such as a virtualized environment operating on the information handling system.

Figure 4:
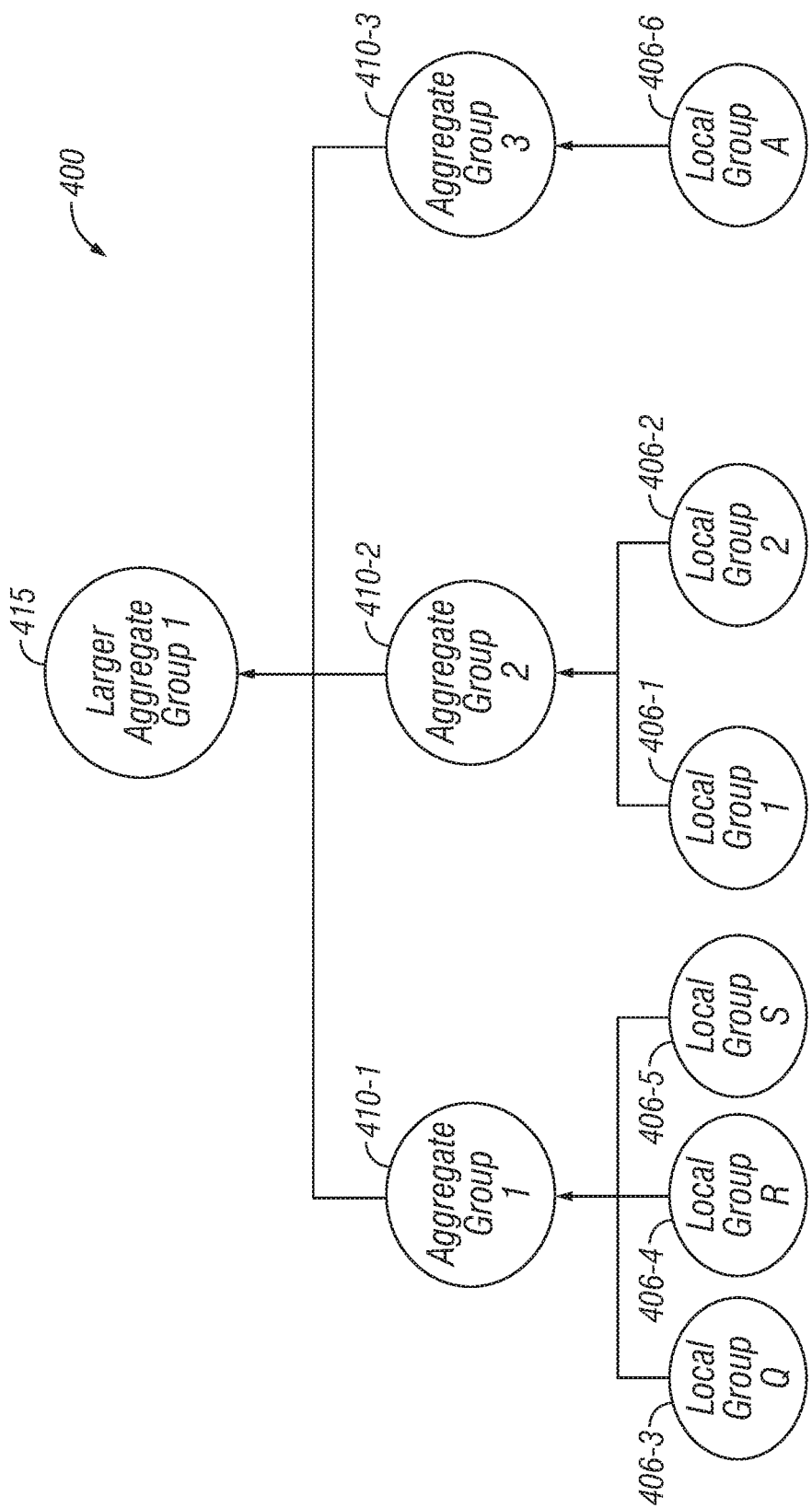
FIG. 4 is a block diagram of selected elements of a group of groups distributed computing group hierarchy, in accordance with some embodiments of the present disclosure.

Referring now to FIG. 4, a block diagram of selected elements of a group of groups distributed computing group hierarchy is shown in accordance with some embodiments of the present disclosure. Distributed computing group hierarchy 400 may include two or more levels of distributed computing node groups. For example, larger aggregate group 1 (415), which may operate as an enterprise datacenter server, may include aggregate group 1 (410-1), aggregate group 2 (410-2), and aggregate group 3 (410-3). Aggregate group 1 (410-1), which may operate as an employee access server, may include local group Q (406-3), local group R (406-4), and local group S (406-5). Each local group may include many management controllers. For example, local group Q (406-3) may include over one hundred management controllers. Aggregate group 2 (410-2), which may operate as a business data analytics server, may include local group 1 (406-1) and local group 2 (406-2). Aggregate group 3 (410-3) may operate as a web portal server and may include local group A (406-6).

A user that logs in to a local group may have full access to management controllers in the group. For example, the user may be able to read and write information and configuration files to each management controller in the local group. The user may have read only access to other local groups (406) in distributed computing group hierarchy 400. For example, a user that logs in to local group 1 (406-1) may be able to read aggregate information about local group Q (406-3). Aggregate information may include, for example, the health status of local group Q (406-3). However, the aggregate information may not include information specific to a particular management controller or information handling system. The user may also have read only access to aggregate information of other aggregate groups (410) or larger aggregate groups (415). If the user initially logs into the group manager of an aggregate group 410, the user may gain full access to each management controller in each local group 406 below the aggregate group 410 in the distributed computing group hierarchy 400. For example, if the user initially logs into the group manager of aggregate group 1 (410-1), the user may gain full access, including the ability to read and write information and configuration files, to each management controller in local group Q (406-3), local group R (406-4), and local group S (406-5).

Although three levels are shown in the distributed computing group hierarchy 400, distributed computing group hierarchy 400 may include two or more levels that are suitable for distributing computing.

Management controllers in distributed computing group hierarchy 400 may enable the user to sign on to a local group (406) and use the same user account credentials without requiring the user to repeatedly enter the information. Management controllers modify a single sign-on token, such as a JSON web token, to include a login location tag, which may represent the server or group identifier corresponding to the location where the user first logged in. The single sign-on token containing the login location tag may be used to authenticate the user account credentials for access to other management controllers. For example, if the user first logged in to a management controller in local group S (406-5), the login location tag may contain the universally unique identifier (UUID) of the management controller or a suitable identifier for the local group, such as one or more portions of the Internet Protocol address for the local group. Other management controllers may receive the single sign-on token and evaluate the login location tag in the token to determine whether a trust link is established with the group associated with the initial log in location. If a trust link is established, management controllers in the same local group may provide for full access privileges and management controllers in the same aggregate group may provide for read only access privileges to aggregate information.

Figure 5A:
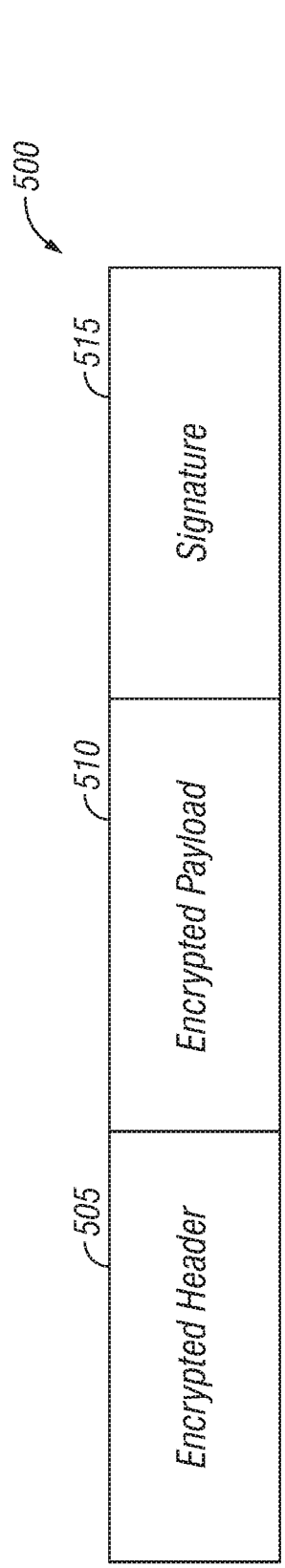
FIG. 5A is a block diagram of selected elements of a single sign-on token, in accordance with some embodiments of the present disclosure.

Referring now to FIG. 5A, a block diagram of selected elements of a single sign-on token is shown in accordance with some embodiments of the present disclosure. Single sign-on token 500 may include encrypted header 505, encrypted payload 510, and signature 515. Encrypted header 505 may provide information about the type of structure used by the single sign-on token and the type of algorithm used for signature 515. For example, the type of structure may be a JSON web token or a modified JSON web token with a login location tag and the type of algorithm may be SHA256. Encrypted payload 510 may provide information about the single sign-on, including the fields described for FIG. 5B. Signature 515 may be a signature of encrypted header 505 and encrypted payload 510. For example, the signature may be a JSON web signature using the SHA256 algorithm with an RSA key length of 4096 bits.

Figure 5B:
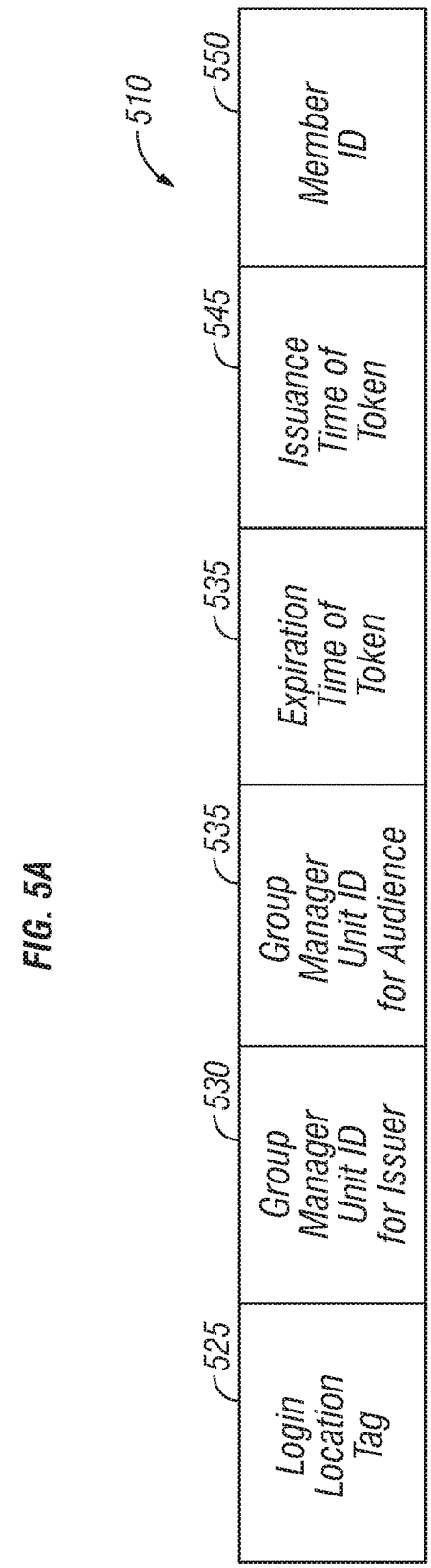
FIG. 5B is a block diagram of selected elements of an encrypted payload, in accordance with some embodiments of the present disclosure.

Referring now to FIG. 5B, a block diagram of selected elements of an encrypted payload is shown in accordance with some embodiments of the present disclosure. Encrypted payload 510 may include a plurality of fields, including login location tag 525, issuer group manager unit ID 530, audience group manager unit ID 535, expiration time of token 540, issuance time of token 545, and member ID 550. Login location tag 525 may indicate the server or identify a group or universally unique identifier (UUID) of a master of a group corresponding to the management controller where the user first logged in. For example, login location tag 525 may indicate the server using a server service tag. If the server service tag corresponds to a management controller in the local group, the user may gain full access privileges. If the server service tag does not correspond to a management controller in the local group, the user may have read only access to aggregate group or larger aggregate group information. Issuer group manager unit ID 530 may indicate the UUID of the group manager, the UUID of the group manager of the aggregate group, the master of a local group, or a member of a local group that issues the single sign-on token. The issuer group manager unit ID 530 may correspond to a different management controller than login location tag 525. If the user has traversed through the distributed computing group hierarchy back to the management controller at which the user initially logged in, the issuer group manager unit ID 530 may correspond to the same management controller as login location tag 525. Audience group manager unit ID 535 may indicate the UUID of the management controller that is the group manager of the aggregate group, the master of a local group, or a member of the local group that is the intended audience for the single sign-on token. Specifying the UUID of the master of the local group, for example, may indicate that the local group is the audience for the single sign-on token. As another example, specifying the UUID of the management controller that is the group manager of the aggregate group may indicate that the aggregate group is the audience for the single sign-on token, which may provide the user with full access to the management controllers in the local groups that are part of the aggregate group. Expiration time of token 540 may indicate when the single sign-on token is set to expire. The expiration time may be defined in any suitable increment, such as 30 seconds. The time may be measured relative to the time at the issuer group manager as specified by issuance time of token 545, which may be defined in the same increment as expiration time of token 540. The user may need to prove user account credentials again after the single sign-on token expires. Member ID 550 may indicate the member UUID of the management controller that most recently used single sign-on token 500. Although encrypted payload is shown with six fields, any number of fields suitable for single sign-on in a distributed computing group hierarchy may be used.

Figure 6:
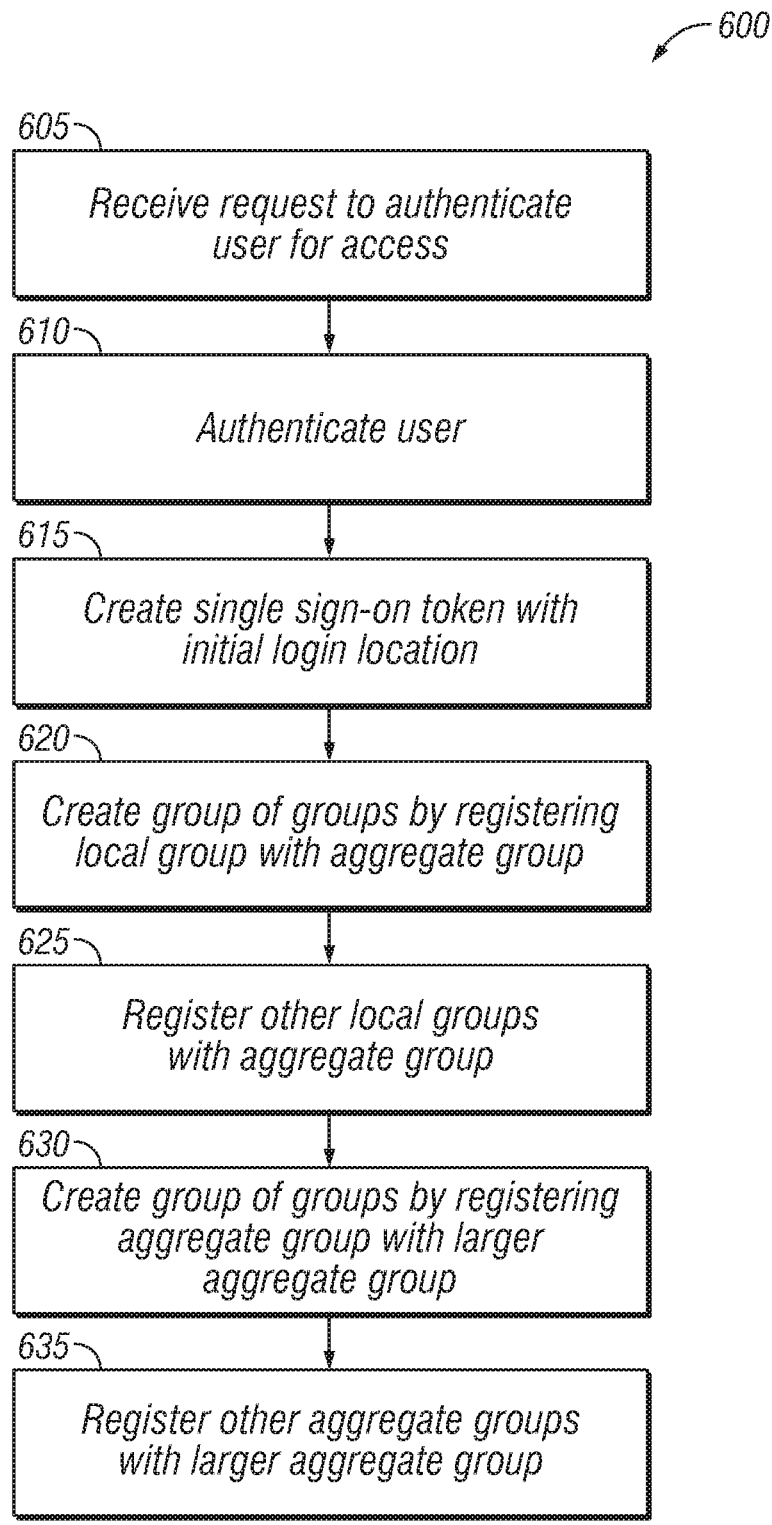
FIG. 6 is a flow chart depicting selected elements of a method for configuring a group of groups distributed computing group hierarchy, in accordance with some embodiments of the present disclosure.

Referring now to FIG. 6, a flow chart depicting selected elements of a method for configuring a group of groups distributed computing group hierarchy is shown in accordance with some embodiments of the present disclosure. Method 600 may be implemented by any of the elements shown in FIGS. 1-5. Method 600 may be initiated by any suitable criteria and may initiate operation at any suitable point. In one embodiment, method 600 may initiate operation at 605. Method 600 may include greater or fewer steps than those illustrated. Moreover, method 600 may execute its steps in an order that is different than those illustrated below. Method 600 may terminate at any suitable step. Moreover, method 600 may repeat operation at any suitable step. Portions of method 600 may be performed in parallel and repeat with respect to other portions of method 600.

At 605, a management controller may receive a request to authenticate a user for access. The request may include user access credentials or a single-on token. At 610, the management controller may authenticate the user by verifying the user access credentials or the single sign-on token. At 615, the management controller may create a single sign-on token for the user with an initial login location corresponding to the management controller if the request included user access credentials. The initial login location may be any suitable identifier for the management controller, such as the UUID of the management controller or the Internet Protocol address of the management controller in the distributed computing group hierarchy.

At 620, the management controller may be used to create a group of groups by registering the local group with an aggregate group. Registration may include adding a certificate for the local group for the aggregate group and adding a certificate for the aggregate group with the local group. The certification may include the Internet Protocol address of a group member, a group UUID, and a group shared public key. The certificates may be imported and exported using a group manager or by manual handling of certificates. Manual handling of the certificates may include the group manager displaying a base64 encoded certificate as a quick response (QR) code for a user to scan using a mobile information handling system. For example, the group manager of the local group may export the certificate of the local group, the group manager of the aggregate group may import the certificate of the local group and export the certificate of the aggregate group, and the group manager of the local group may then import the certificate of the aggregate group. As another example, the group managers of the local group and aggregate group may display QR codes representing their certificates. In this case, the user may scan the QR codes using a mobile information handling system, and import the local group certificate into the aggregate group and the aggregate group certificate into the local group.

At 625, the management controller may be used to register other local groups with the aggregate group. For example, "Local Group 2," "Local Group 3," and "Local Group 4" may join "Aggregate Group 1." At 630, the management controller may be used to create a larger aggregate group. For example, "Larger Aggregate Group 1" may be created to include "Aggregate Group 1." At 635, other aggregate groups may be registered with the larger aggregate group. For example, "Aggregate Group 2" and "Aggregate Group 3" may be registered with the "Larger Aggregate Group 1."

Figure 7:
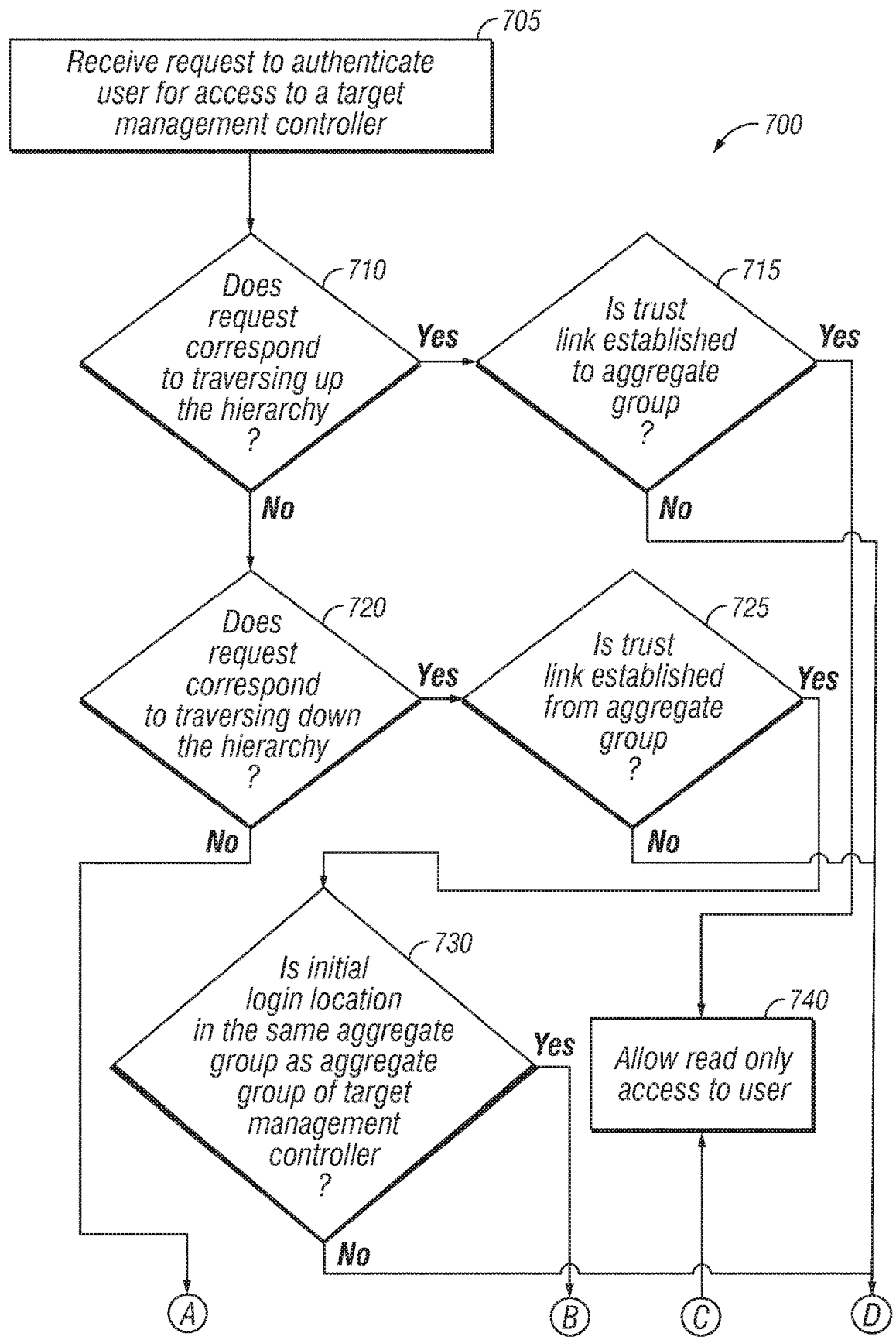
FIG. 7 is a flow chart depicting selected elements of a method for group of groups single sign-on demarcation based on first user login, in accordance with some embodiments of the present disclosure.
Figure 7:
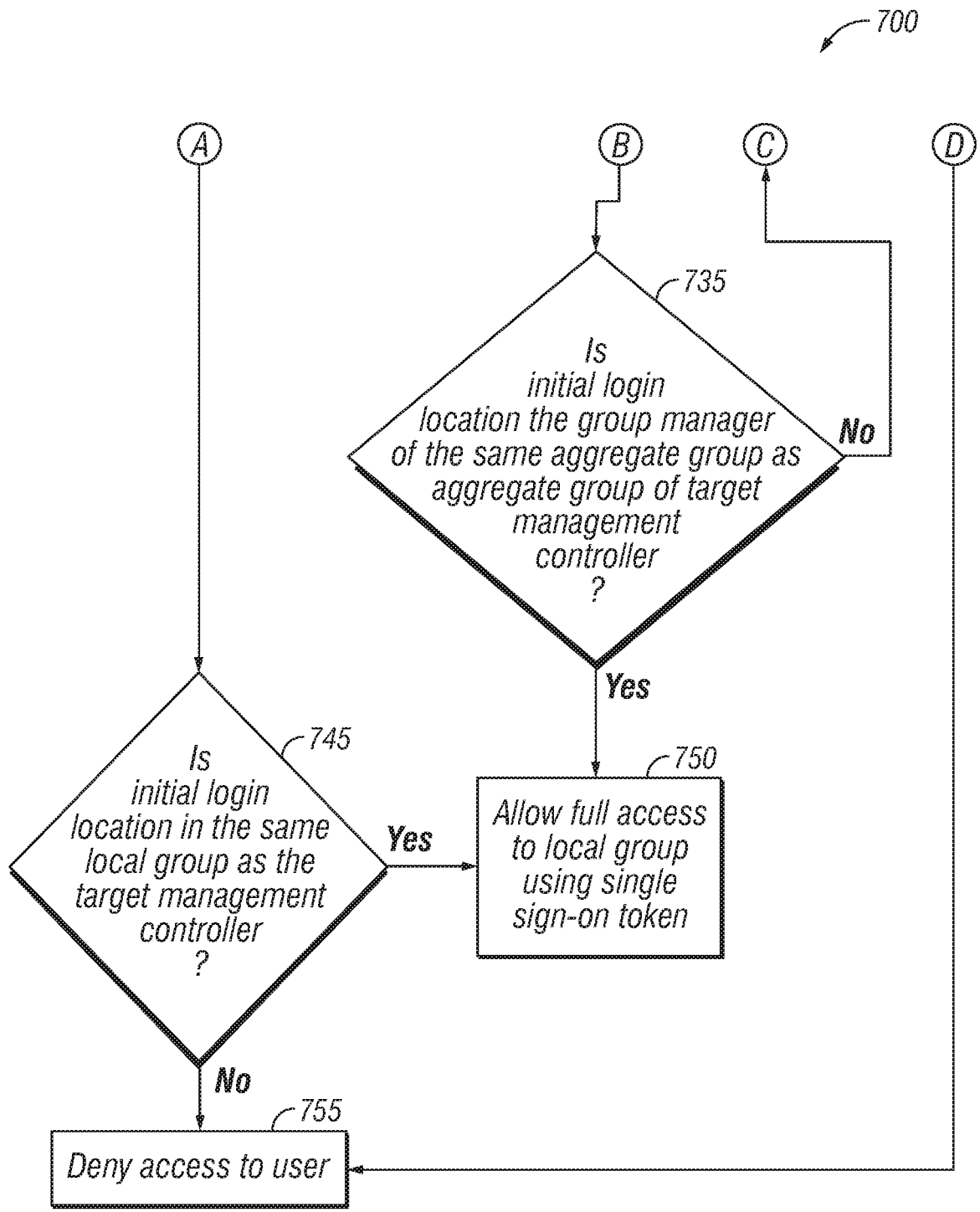

Referring now to FIG. 7, a flow chart depicting selected elements of a method for group of groups single sign-on demarcation based on first user login is shown in accordance with some embodiments of the present disclosure. Method 700 may be implemented by any of the elements shown in FIGS. 1-6. Method 700 may be initiated by any suitable criteria and may initiate operation at any suitable point. In one embodiment, method 700 may initiate operation at 705. Method 700 may include greater or fewer steps than those illustrated. Moreover, method 700 may execute its steps in an order that is different than those illustrated below. Method 700 may terminate at any suitable step. Moreover, method 700 may repeat operation at any suitable step. Portions of method 700 may be performed in parallel and repeat with respect to other portions of method 700.

At 705, a management controller may receive a request to authenticate the user for access to a target management controller. At 710, it may be determined whether the request corresponds to traversing up the distributed computing group hierarchy. If the request corresponds to traversing upward, method 700 may proceed to 715. Otherwise, method 700 may proceed to 720. At 715, it may be determined whether a trust link is established to the aggregate group. A trust link may be established between groups at any two levels in the distributed computing group hierarchy. For example, a trust link may be established between a local group and an aggregate group. As another example, a trust link may be established between an aggregate group and a larger aggregate group. The aggregate group may be the group in which the target management controller resides. If a trust link is established, method 700 may proceed to 740. Otherwise, method 700 may proceed to 755. At 720, it may be determined whether the request corresponds to traversing down the distributed computing group hierarchy. If the request corresponds to traversing downward, method 700 may proceed to 725. Otherwise, method 700 may proceed to 745.

At 725, it may be determined whether a trust link is established from the aggregate group. The target management controller may be a member of the aggregate group. If a trust link is established, method 700 may proceed to 730. Otherwise, method 700 may proceed to 755. At 730, it may be determined whether the initial login location is in the same aggregate group as the aggregate group of the target management controller. If the aggregate groups are the same, method 700 may proceed to 735. Otherwise, method 700 may proceed to 755. At 735, it may be determined whether the initial login location is the group manager of the same aggregate group as the aggregate group of the target management controller. If the initial login location is the group manager of the same aggregate group, method 700 may proceed to 750. Otherwise, method 700 may proceed to 740. At 740, read only access may be allowed for the user. The user may be able to read aggregate information about the target management controller based on the initial login location of the user and the location of the target management controller.

At 745, it may be determined whether the initial login location is in the same local group as the target management controller. The initial login location in the single sign-on token may be used to determine the local group for which the user has access. If the local groups are the same, method 700 may proceed to 750. Otherwise, method 700 may proceed to 755. At 750, full access to the local group of the target management controller may be allowed using the single sign-on token. For example, the information and configuration files of each management controller in the local group may be read, written, and/or modified. At 755, user access may be denied.

Figure 8:
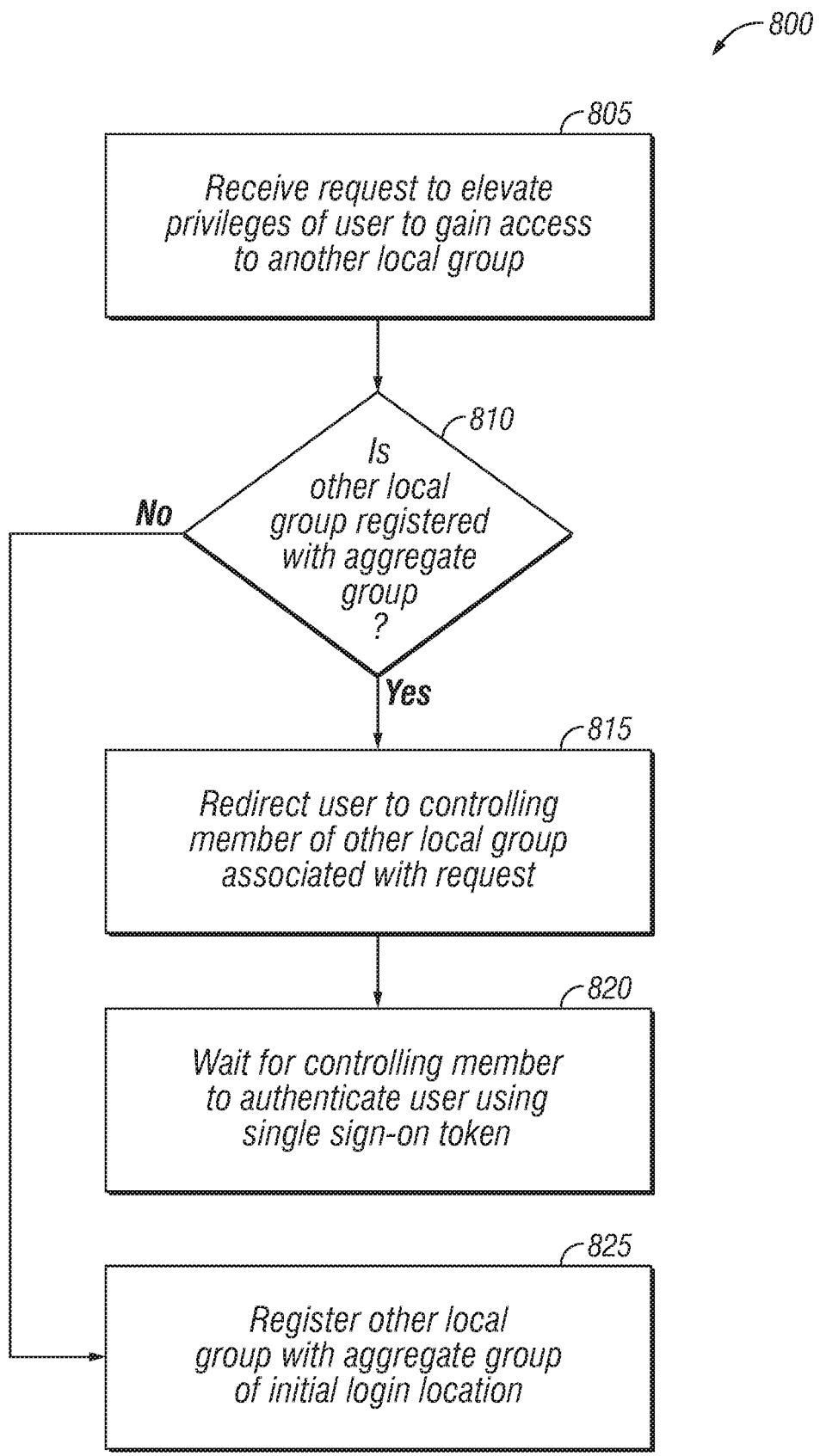
FIG. 8 is a flow chart depicting selected elements of a method for elevated privileges of single sign-on in a group of groups, in accordance with some embodiments of the present disclosure.

Referring now to FIG. 8, a flow chart depicting selected elements of a method for elevated privileges of single sign-on in a group of groups is shown in accordance with some embodiments of the present disclosure. Method 800 may be implemented by any of the elements shown in FIGS. 1-7. Method 800 may be initiated by any suitable criteria and may initiate operation at any suitable point. In one embodiment, method 800 may initiate operation at 805. Method 800 may include greater or fewer steps than those illustrated. Moreover, method 800 may execute its steps in an order that is different than those illustrated below. Method 800 may terminate at any suitable step. Moreover, method 800 may repeat operation at any suitable step. Portions of method 800 may be performed in parallel and repeat with respect to other portions of method 800.

At 805, a management controller may receive a request from a user to elevate the privileges of the user for the user to gain access to another local group. The management controller may operate as the group manager for the local group. The user may have previously provided user account credentials to log in to the local group. A single sign-on token with the initial login location may have been created when the user first logged in using user account credentials.

At 810, it may be determined whether the other local group is registered with the aggregate group associated with the management controller that received the request. The management controller may determine which other local group the request is directed to by using any suitable identifier for the other local group, such as the UUID or Internet Protocol address of the group manager or master for the other local group. If the other local group is already registered with the aggregate group, the group manager of the aggregate group may hold a certificate corresponding to the other local group. The certificate may include one or more identifiers corresponding to the other local group including, but not limited to, the Internet Protocol address of a group member, a group UUID, and a group shared public key. If the other local group is registered with the aggregate group, method 800 may proceed to 815. Otherwise, method 800 may proceed to 825. At 815, the management controller that received the request may redirect the request to a controlling member. The controlling member may be the controlling member of the other local group or the controlling member of the aggregate group that includes the local group at which the request was received and the other local group. The controlling member of the aggregate group, such as the group manager or master of the aggregate group or larger aggregate group, may have all the required information to authenticate the user using a single sign-on token. The management controller that received the request may include a single sign-on token for the user in the redirection. For example, the management controller may redirect the request to the group manager or master of the other local group. The redirection may result in the user being prompted by a member of the other local group for user account credentials to elevate the access privileges for the user. For example, the user may be shown a new webpage or window in which the user may enter user account credentials for authentication, such as biometric authentication, smartcard authentication, and/or authentication using a username and password. Other suitable forms of authentication that may verify the identity and credentials of the user may be used. For example, the controlling member may update the single sign-on token after the user is authenticated. The single sign-on token may be updated with the initial login location such that the user has full access to at least two local groups. As another example, the controlling member may create a new single sign-on token or a portion of a new single sign-on token, such as the initial login location, and send the information back to the management controller that redirected the request.

At 820, the management controller that received the request may wait for the controlling member of the other local group to authenticate the user using the single sign-on token. The management controller may receive a single sign-on token from the controlling member of the other local group. At 825, the management controller may register the other local group with the aggregate group corresponding to the initial login location. Registration may be performed by group managers and/or a user, as described in more detail for 620 and 625 of FIG. 6 above. For example, if the initial login location was a management controller in "Local Group 1," which is part of "Aggregate Group 1," the other local group ("Local Group 2") may be registered with "Aggregate Group 1."

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for access in a management controller group hierarchy, comprising:

receiving a request for a user at a first management controller of a first information handling system in a management controller group hierarchy, the request to authenticate the user for access using a single sign-on token and the management controller group hierarchy formed with two or more levels, each level formed with one or more groups corresponding to one or more management controllers of one or more information handling systems;

determining whether a link of trust is established based on an initial login location stored in the single sign-on token;

validating the request to authenticate the user for access using the single sign-on token based on a determination that the link of trust is established;

determining whether the initial login location is recognized;

based on a determination that the initial login location is not recognized:

granting the user access to view information about an aggregate group in the management controller group hierarchy, the aggregate group including a first local group in the management controller group hierarchy; and denying the user access to the first local group of the aggregate group.

2. The method of claim 1, further comprising:

receiving a re-authenticated single sign-on token from a controlling member of a second local group in the management controller group hierarchy, the re-authenticated single sign-on token received after a request to elevate privileges is received and the second local group not including the first management controller; and granting the user full access to the second local group of the aggregate group based on receiving the re-authenticated single sign-on token from the controlling member of the second local group.

3. The method of claim 1, further comprising:

receiving a request to elevate privileges of the user to enable access to a second local group in the management controller group hierarchy, the second local group in the management controller group hierarchy not including the first management controller of the first information handling system;

redirecting the request to elevate privileges to a controlling member of the second local group; and receiving a re-authenticated single sign-on token back from the controlling member of the second local group.

4. The method of claim 3, further comprising:

determining whether a login location stored in the re-authenticated single sign-on token corresponds to a second management controller that manages the aggregate group in the management controller group hierarchy, the aggregate group including the first management controller of the first information handling system that received the request to authenticate the user for access; and granting the user full access to the first local group and second local group based on a determination that the login location stored in the re-authenticated single sign-on token corresponds to the second management controller that manages the aggregate group in the management controller group hierarchy.

5. The method in claim 1, wherein determining whether the link of trust is established based on the initial login location is based on a determination whether the management controller of the first information handling system and a second management controller of a second information handling system are part of the same local group in the management controller group hierarchy.

6. An information handling system, comprising:

a processor subsystem comprising a primary processor having access to a first memory;

a management controller comprising a secondary processor having access to a second memory, the second memory including an embedded storage partition and the second memory storing instructions executable by the secondary processor to:

receive a request for a user at the management controller of the information handling system in a management controller group hierarchy, the request to authenticate the user for access using a single sign-on token and the management controller group hierarchy formed with two or more levels, each level formed with one or more groups corresponding to one or more management controllers of one or more information handling systems;

determine whether a link of trust is established based on an initial login location stored in the single sign-on token;

validate request to authenticate the user for access using the single sign-on token based on a determination that the link of trust is established;

determine whether the initial login location is recognized;

based on a determination that the initial login location is not recognized:

grant the user access to view information about an aggregate group in the management controller group hierarchy, the aggregate group including a first local group in the management controller group hierarchy; and deny the user access to the first local group of the aggregate group.

7. The information handling system of claim 6, further comprising instructions executable by the secondary processor to:

receive a re-authenticated single sign-on token from a controlling member of a second local group in the management controller group hierarchy, the re-authenticated single sign-on token received after a request to elevate privileges is received and the second local group not including the management controller; and grant the user full access to the second local group of the aggregate group based on receipt of the re-authenticated single sign-on token from the controlling member of the second local group.

8. The information handling system of claim 6, further comprising instructions executable by the secondary processor to:

receive a request to elevate privileges of the user to enable access to a second local group in the management controller group hierarchy, the second local group in the management controller group hierarchy not including the management controller of the information handling system;

redirect the request to elevate privileges to a controlling member of the second local group; and receive a re-authenticated single sign-on token back from the controlling member of the second local group.

9. The information handling system of claim 8, further comprising instructions executable by the secondary processor to:

determine whether a login location stored in the re-authenticated single sign-on token corresponds to another management controller that manages the aggregate group in the management controller group hierarchy, the aggregate group including the management controller of the information handling system that received the request to authenticate the user for access; and grant the user full access to the first local group and the second local group based on a determination that the login location stored in the re-authenticated single sign-on token corresponds to the management controller that manages the aggregate group in the management controller group hierarchy.

10. The information handling system of claim 6, wherein a determination of whether the link of trust is established based on the initial login location is based on a determination whether the management controller of the information handling system and a target management controller of another second information handling system are part of the same local group in the management controller group hierarchy.

11. The information handling system of claim 6, wherein the initial login location stored in the single sign-on token indicates a service tag that corresponds to an initial management controller of an initial information handling system that corresponds to the initial login location.

12. A management controller for an information handling system having a primary processor and a primary memory, the management controller comprising a secondary processor having access to a secondary memory, the secondary memory including an embedded storage partition and the secondary memory storing instructions executable by the secondary processor to:
receive a request for a user at the management controller of the information handling system in a management controller group hierarchy, the request to authenticate the user for access using a single sign-on token and the management controller group hierarchy formed with two or more levels, each level formed with one or more groups corresponding to one or more management controllers of one or more information handling systems;
determine whether a link of trust is established based on an initial login location stored in the single sign-on token;
validate the request to authenticate the user for access using the single sign-on token based on a determination that the link of trust is established;
determine whether the initial login location is recognized;
based on a determination that the initial login location is not recognized:
grant the user access to view information about an aggregate group in the management controller group hierarchy, the aggregate group including a first local group in the management controller group hierarchy; and
deny the user access to the first local group included in the aggregate group.

13. The management controller of claim 12, further comprising instructions executable by the secondary processor to:
receive a re-authenticated single sign-on token from a controlling member of a second local group in the management controller group hierarchy, the re-authenticated single sign-on token received after a request to elevate privileges is received and the second local group not including the management controller; and
grant the user full access to the second local group of the aggregate group based on receipt of the re-authenticated single sign-on token from the controlling member of the second local group.

14. The management controller of claim 12, further comprising instructions executable by the secondary processor to:
receive a request to elevate privileges of the user to enable access to a second local group in the management controller group hierarchy, the second local group in the management controller group hierarchy not including the management controller of the information handling system;
redirect the request to elevate privileges to a controlling member of the second local group; and
receive a re-authenticated single sign-on token back from the controlling member of the second local group.

15. The management controller of claim 14, further comprising instructions executable by the secondary processor to:
determine whether a login location stored in the re-authenticated single sign-on token corresponds to another management controller that manages the aggregate group in the management controller group hierarchy, the aggregate group including the management controller of the information handling system that received the request to authenticate the user for access; and
grant the user full access to the first local group and the second local group based on a determination that the login location stored in the re-authenticated single sign-on token corresponds to the management controller that manages the aggregate group in the management controller group hierarchy.

16. The management controller of claim 12, wherein a determination of whether the link of trust is established based on the initial login location is based on a determination whether the management controller of the information handling system and a target management controller of another information handling system are part of the same local group in the management controller group hierarchy.

17. The management controller of claim 12, wherein the initial login location stored in the single sign-on token indicates a service tag that corresponds to an initial management controller of an initial information handling system that corresponds to the initial login location.

* * * * *